(12) United States Patent
Agrawal et al.

(10) Patent No.: US 11,569,747 B2
(45) Date of Patent: Jan. 31, 2023

(54) ADAPTIVE PHASE ADD/SHED FOR A POWER CONVERTER

(71) Applicant: Apple Inc., Cupertino, CA (US)

(72) Inventors: Jitendra K. Agrawal, Fremont, CA (US); Yue Wen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/193,983

(22) Filed: Mar. 5, 2021

(65) Prior Publication Data

US 2022/0286053 A1 Sep. 8, 2022

(51) Int. Cl.
H02M 3/158 (2006.01)

(52) U.S. Cl.
CPC ........ *H02M 3/1584* (2013.01); *H02M 3/1586* (2021.05)

(58) Field of Classification Search
None
See application file for complete search history.

(56) References Cited

U.S. PATENT DOCUMENTS

| | | | |
|---|---|---|---|
| 6,806,689 B2 | 10/2004 | Schuellein et al. | |
| 6,826,028 B2 | 11/2004 | Schuellein | |
| 8,228,049 B2 | 7/2012 | Qiu et al. | |
| 8,742,738 B2 * | 6/2014 | Houston | G05F 1/10 323/283 |
| 9,350,244 B2 * | 5/2016 | Tang | H02M 3/1584 |
| 9,496,791 B2 | 11/2016 | Ejury | |
| 10,423,210 B2 * | 9/2019 | Luo | G06F 1/26 |
| 10,630,182 B2 * | 4/2020 | Murakami | H02M 3/1584 |
| 11,005,370 B2 * | 5/2021 | Tt | H02M 3/1584 |

* cited by examiner

*Primary Examiner* — Jeffrey A Gblende
(74) *Attorney, Agent, or Firm* — Kowert, Hood, Munyon, Rankin & Goetzel, P.C.; Erik A. Heter; Dean M. Munyon (57) ABSTRACT

A method and apparatus for adding and shedding phases in a multi-phase power converter is disclosed. A power converter includes a plurality of voltage regulators including a given voltage regulator configured to generate, when active, a particular output voltage on a regulated power supply node. The power converter further includes a control circuit. The control circuit is configured determine an amount of output current being supplied to the regulated power supply node by active ones of the plurality of voltage regulator circuits. The control circuit is further configured to adjust a number of voltage regulator circuits that are active based on the output current and one or more environmental parameters associated with the plurality of voltage regulator circuits.

20 Claims, 7 Drawing Sheets

ADAPTIVE PHASE ADD/SHED FOR A POWER CONVERTER

BACKGROUND

Technical Field

This disclosure is directed to power converters, and more particularly, to switching power converters.

Description of the Related Art

Power converters are well known in the electronic arts. Power converters include linear voltage regulators (e.g., low dropout, or LDO) regulators, as well as switching power converters. Switching power converters include buck converters, in which the output voltage is less than the input voltage, and boost converters, in which the output voltage is greater than the input voltage. Such switching converters may trade voltage and current in the buck or boost operation, and may provide greater efficiency than linear voltage regulators.

Some power converters may be implemented as single-phase, while others may be implemented as multi-phase. For example, a single-phase buck converter includes a single inductor and a pair of switches. A multi-phase buck converter may be considered to be a number of single-phase converters coupled together, and thus comprises multiple inductors and multiple pairs of switches. The inductors may be coupled to one another on an output voltage node. Single-phase buck converters may be useful for relatively low current applications. When higher currents are demanded, a multi-phase buck converter may be used, thereby allowing each of the active phases to contribute a portion of the overall output current. A control circuit may be provided to add or shed phases (e.g., turn on or turn off) in accordance with a load current demand.

SUMMARY

A method and apparatus for adding and shedding phases in a multi-phase power converter is disclosed. In one embodiment, a power converter includes a plurality of voltage regulators including a given voltage regulator configured to generate, when active, a particular output voltage on a regulated power supply node. The power converter further includes a control circuit. The control circuit is configured to determine an amount of output current being supplied to the regulated power supply node by active ones of the plurality of voltage regulator circuits. The control circuit is further configured to adjust a number of voltage regulator circuits that are active based on the output current and one or more environmental parameters associated with the plurality of voltage regulator circuits.

In one embodiment, the control circuit includes a comparator and a threshold generation circuit. The comparator is configured to receive a first signal corresponding to the output current supplied by the power converter, and a second signal corresponding to an adjustable threshold. The threshold generation circuit is configured to receive one or more signals each corresponding to one or more of the environmental parameters. Based on the one or more environmental parameters (which may include, e.g., input voltage, temperature, output voltage, etc.) the threshold generation circuit generates a current value of the adjustable threshold. The comparator compares the adjustable threshold to the output current. Based on this comparison, the control circuit may activate or deactivate various ones of the voltage regulator circuits.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to a control scheme for adding/shedding phases in a multi-phase power converter (e.g., buck converter, although the disclosure is not limited to this type). As used herein, the term "phase" may be defined as an instance of a voltage regulator circuit, such as a buck converter, boost converter, low dropout (LDO) voltage regulator, etc. A multi-phase power converter may accordingly be defined herein as a power converter that includes multiple voltage regulator circuits, or phases, that may be coupled to one another to generate a regulated output voltage. A multi-phase power converter may further be defined herein as a power converter that may, at given times during operation, use multiple instances of a voltage regulator circuit to generate the regulated output voltage.

In multi-phase power converters, current control schemes utilize output current as the parameter upon which to decide whether to add (e.g., activate/commence operation of) an additional phase or shed (e.g., deactivate/discontinue operation of) a currently operating phase. Generally speaking, more phases are added as output current (dependent on the current demanded by the load) increases, while phases are shed as output current decreases.

Output current, however, is only one parameter that affects the efficiency of operation for a multi-phase power converter. Accordingly, reliance solely on output current as the basis for adding and shedding phases does not optimize the efficiency of a multi-phase power converter. Efficiency of a power converter is an important consideration, particularly in portable applications (e.g., smart phones) which rely on battery power.

The present disclosure makes use of the insight that there are other parameters that can affect the efficiency of a multi-phase power converter in determining when to add or shed phases. Accordingly, a control loop for a multi-phase power converter in the present application utilizes additional environmental parameters as a basis to optimize efficiency. These environmental parameters may include input voltage, output voltage, and temperature, among others, which are used in conjunction with the output current in determining when a phase should be added or shed.

In one embodiment, a control circuit includes a comparator that compares the output current to a threshold value. However, rather than using a single, fixed output current threshold, the control loop of the present disclosure implements a variable threshold that depends on one or more environmental parameters. Accordingly, the variable threshold becomes the basis upon which the control loop determines whether to add or shed a phase. As a result, the efficiency of the multi-phase power converter may be optimized over what is possible in converters in which only a fixed threshold are used. This in turn may result in more efficient operation of a multi-phase power converter, with less wasted energy, and thus, longer battery life when implemented in a portable, battery powered device.

With regard to the present disclosure, an environmental parameter may be defined herein as a parameter associated with the operation of a particular power converter, such as those disclosed herein. Such environmental parameters may include output current, output voltage, input voltage, and temperature, among others. Generally speaking, any parameter of the surrounding environment and/or produced by the power converter itself that can affect its operation may be used in the determination of the variable threshold value.

It is further noted that the following examples are directed to buck converters, in which the output voltage is provided at a lower value than the input voltage. However, the disclosure is not limited in this manner. Accordingly, the present disclosure contemplates any type of multi-phase power converter, including boost converters and linear regulators as well as the buck converters discussed below.

The present disclosure begins with a discussion of a basic power converter in which environmental parameters are used to set a variable threshold for comparison with an output current in a current control loop. Following this discussion, different embodiments of control circuitry that may be used to generate a variable threshold for a current control loop are discussed. The discussion continues with examples of power converters in which the control circuitry of the present disclosure may be implemented. A method for operating a control circuit to add or shed phases in a multi-phase power converter follows, followed by discussion of an example system.

Figure 1:
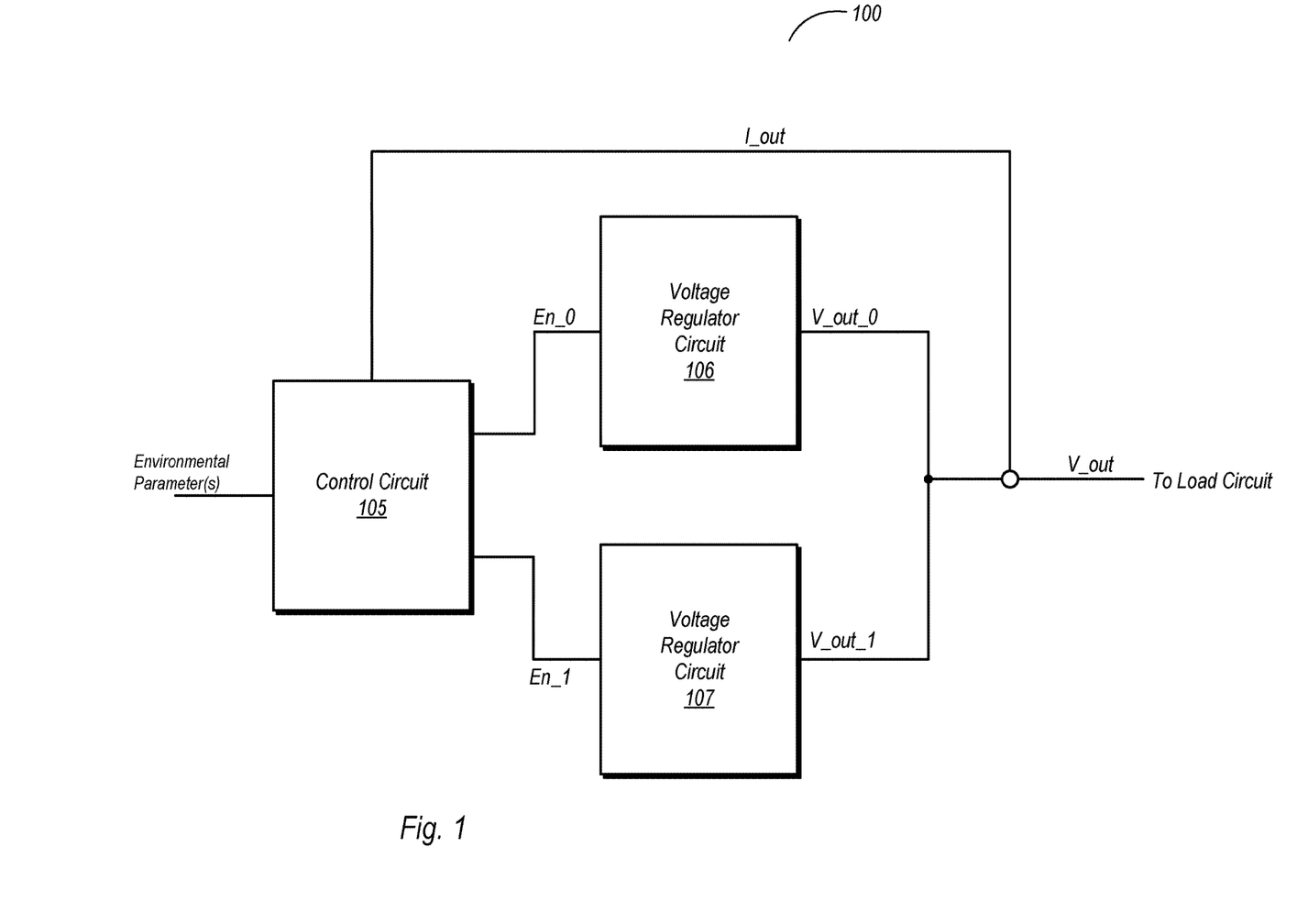
FIG. 1 is a block diagram of one embodiment of a multi-phase power converter.

Multi-Phase Power Converter with Adaptive Adding and Shedding of Phases:

FIG. 1 is a block diagram of one embodiment of a power converter. In the embodiment shown, power converter 100 is a multi-phase power converter, having two separate voltage regulator circuits 106 and 107, which may be referred to as phases. The voltage regulator circuits 106 and 107 may be any type of circuit configured to provide a regulated output voltage. Accordingly, voltage regulator circuits 106 and 107 may be buck converters, boost converters, or one of a number of different types of linear voltage regulators. In this particular example, two phases are present, although the number of phases can be greater in other embodiments and the disclosure is not limited to the number shown here. Power converter 100 also includes a control circuit 105 configured to enable and disable the different phases/voltage regulators.

Power converter 100 is coupled to provide a regulated output voltage, V_out, to a load circuit (not shown in this figure). The load circuit may be any type of circuitry, including analog circuitry, digital circuitry, and mixed signal circuitry. In some embodiments, both power converter 100 and the load circuit are implemented on a common integrated circuit die. However, embodiments in which the load circuit is implemented on silicon different from power converter 100 are also possible and contemplated.

Control circuit 105 as shown here is coupled to receive, as a feedback signal, an output current, I_out, from an output node of power converter 100. Control circuit 105 is also configured to receive one or more signals indicating values of corresponding environmental parameters. The environmental parameters may include (but are not limited to) an input voltage provided to power converter 100, an output voltage provided from power converter 100, a temperature of power converter 100 during operation, and so on. Control circuit 105 may use the output current and the signals corresponding to the environmental parameters in order to determine when a phase is to be added or shed. A phase may be added by asserting a corresponding enable signal, thereby activating the correspondingly coupled one of voltage regulators 106/107. Similarly, a phase may be shed by de-asserting a corresponding enable signal, thereby de-activating the correspondingly coupled one of voltage regulators 106/107.

In using the output current and signals corresponding to environmental parameters, control circuit 105 may use the latter to generate a threshold value. This threshold value may vary with the environmental parameters. For example, if the temperature rises, a value of a signal corresponding to the temperature may also rise. The output current received as feedback by control circuit 105 may include comparison circuitry to compare the output current with the threshold, and may add or shed phases based on the results. Accordingly, as the values of the environmental parameters change, the threshold that is used as a basis for comparison with the output current also changes. In embodiments in which two or more environmental parameters are used in generating the threshold voltage, the total change may be an aggregate of changes to individual environmental parameters. It is noted that since both the output current and the threshold may change over time, circuitry to implement hysteresis may be incorporated into control circuit 105 to prevent oscillation that could occur due to, e.g., rapid but relatively insignificant changes in the comparison results. For example, in one embodiment, a low pass filter (analog or digital) may be implement the hysteresis functionality, filtering out high frequency components in the variable threshold.

Thus, using control circuit 105 and the operation described above, the operation of power converter 100 may be optimized for particular operating conditions. For example, low current demand by a load circuit may cause control circuit 105 to activate only a single phase to optimize efficiency. For higher load current demands, control circuit 105 may activate a second phase to optimize transient response and meet the current demand. In embodiments with more than two phases, control circuit 105 may be able to achieve an even greater granularity of optimizing a trade-off between efficiency and, e.g., transient response in determining the number of phases to be active at a given time. Further granularity may be achieved in certain types of switching converters by alternating switching modes between pulse frequency modulation (PFM) and pulse width modulation (PWM). Distinguishing these different conditions from one another may be realized by the comparison of the output current to the variable threshold based on environmental parameters.

Figure 2:
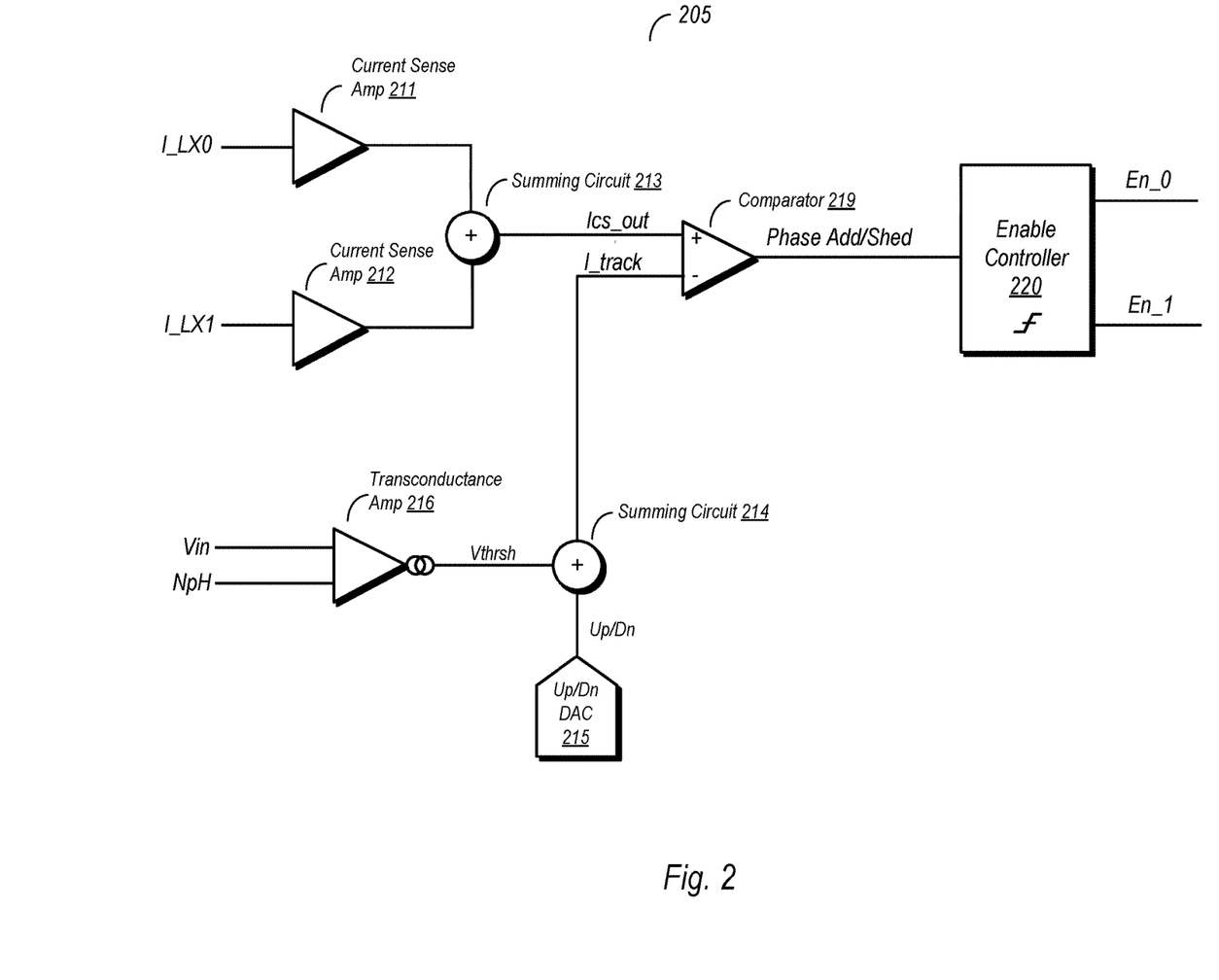
FIG. 2 is a diagram of one embodiment of a control circuit for determining whether to enable or disable a phase of a multi-phase power converter.

Current Control Loop with Variable Current Threshold:

FIG. 2 is a diagram of one embodiment of a control circuit for determining whether to enable or disable a phase of a multi-phase power converter. Control circuit 205 of FIG. 2 is one possible embodiment of an analog control circuit that may be used in determining when to add or shed phases. The phases in the embodiment shown are switching regulators, with control circuit 205 coupled to measure output current on their respective switching nodes, I_LX0 and I_LX1. The embodiment shown is further configured to generate a variable threshold based on an input voltage provided to the corresponding power converter.

Control circuit 205 as shown here includes first and second current sense amplifiers 211 and 212, respectively. Current sense amplifier 211 is configured to receive a first current, I_LX0 from a switching node of a switching regulator implementing a first phase. Similarly, current sense amplifier 212 is configured to receive a second current, I_LX1, from a switching node of another switching regulator implementing a second phase. Each of current sense amplifiers 211 and 212 may generate respective output signals (e.g., as voltage levels) that are input into summing circuit 213. The respective magnitudes of these signals may be added to one another by summing circuit 212 to form another signal, Ics_out, which is indicative of an amount of output current provided by the correspondingly coupled power converter. This signal is provided as a first input into comparator 219.

Transconductance amplifier 216 in the embodiment shown is coupled to receive an input voltage, Vin, and a reference voltage, NpH, and is configured to generate an initial threshold value, Vthresh, which is provided to another summing circuit 214. Although the input voltage is used as the environmental parameter in this particular embodiment, other embodiments using temperature, output voltage, and so on are possible and contemplated. A digital-to-analog converter (DAC), Up/Dn DAC 215, is configured to output a voltage that is indicative of the number of currently active phases, and generate a signal Up/Dn. These two signals are added by summing circuit 214 to generate the threshold value I_track, which is provided to a second input of comparator 219. In this particular example, the Up/Dn signal may be used to provide coarse adjustment to the value of I_track, while the Vthresh signal may be used to provide a fine adjustment.

Comparator 219 in the embodiment shown compares the values of Ics_out to I_track and generates a phase add/shed signal. Based on this comparison, enable controller 220 may generate enable signals En_0 and En_1. More particularly, enable controller 220 may assert the respective enable signals for the phases to be activated and de-assert the respective enable signals for phases to be de-activated. Enable controller 220 may also determine, which of the phases is to be active in the case that only a single one is to be active for a given control state. It is further noted that enable controller 220 may include circuitry to introduce hysteresis into the control loop to prevent, e.g., oscillation whereby a phase is rapidly and repeatedly activated and deactivated in a very short period of time.

Although the embodiment shown is directed to using only one environmental parameter, embodiments of an analog-based control system in which the threshold is adjusted based on multiple environmental parameters are possible and contemplated. Such embodiments may include additional ones of the various circuit elements shown here and/or may include different circuit elements. The additional and/or different circuit elements may be arranged in such a manner that various analog signals corresponding to the environmental parameters may be combined into a single threshold signal.

Figure 3:
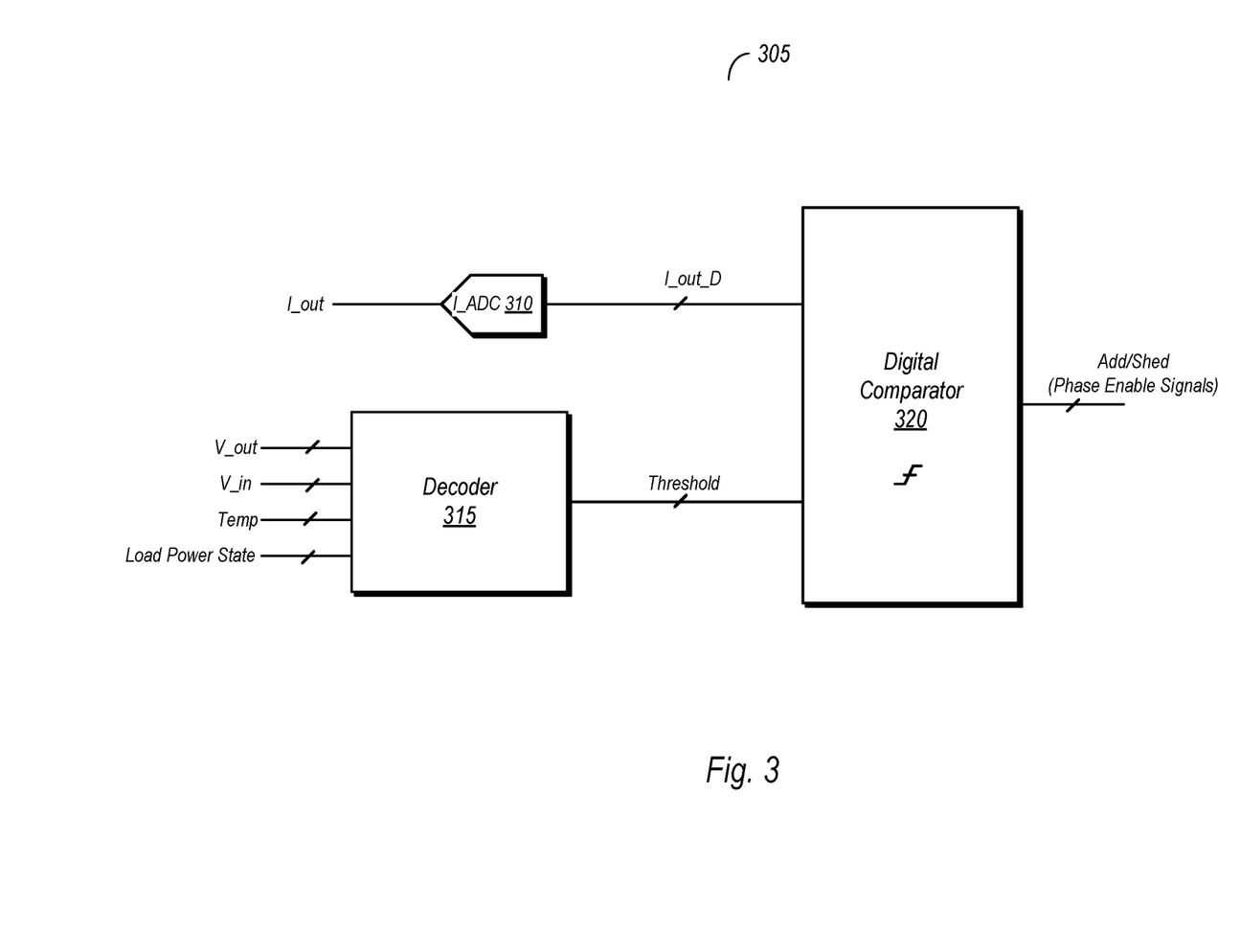
FIG. 3 is a diagram of another embodiment of a control circuit for determining whether to enable or disable a phase of a multi-phase power converter.

FIG. 3 is a block diagram of another embodiment of a control system used for determining whether or not to add or shed a phase of a multi-phase power converter. In this embodiment, control circuit 305 is a digital control system, and utilizes multiple environmental parameters to determine a threshold used as a basis for comparison with the output current. Control circuit 305 includes a current analog-to-digital converter (ADC) 310 coupled to receive the output current, I_out and convert it into a corresponding digital value, I_out_D. Control circuit 305 further includes a decoder 315 coupled to receive signals corresponding to various environmental parameters. Digital comparator 320 in the embodiment shown is coupled to receive the first digital value, I_out_D and a second value, Threshold. Digital comparator 320 may perform comparisons on these two signals to determine whether phases are to be added or shed for a corresponding multi-phase power converter.

In the embodiment shown, decoder 315 is configured to receive signals for a number of different environmental parameters. These environmental parameters include an output voltage (V_out) of the power converter, an input voltage (V_in) of the power converter, a temperature (Temp) and a load power state (e.g., an indication of present load power consumption). In this particular example, these signals are received digitally after being previously converted from an analog format. However, embodiments are also possible and contemplated wherein at least some of these signals are received in an analog format and converted into digital values within decoder 315. It is further noted that while certain environmental parameters are quantized in this particular embodiment, the disclosure contemplates a wide variety of environmental parameter combinations that may be used to generate the threshold value.

Decoder 315 may aggregate the digital signals of the various environmental parameters in order to determine the threshold value. Implementation of decoder 315 may be performed in a variety of ways, including hardwired circuitry, programmable logic (e.g., a field programmable gate array) and so on. The circuitry/logic used to implement decoder 315 may, in some embodiments, provide weighting to the various environmental parameters to further optimize the generation of the threshold value. This in turn may optimize operation of the overall control loop used to determine when phases are to be added or shed.

Digital comparator 320 in the embodiment shown may perform a comparison of the two received digital values to determine whether phases are to be added or shed. Similar to other embodiments disclosed herein, digital comparator 320 may further implement hysteresis to prevent oscillation or, more generally, a large number of changes in a short period of time. This may add to the overall stability of the control loop while still allowing optimization of the particular power converter in which the control loop is implemented. Based on the operations performed, digital comparator 320 provides as outputs a number of enable signals, each of which corresponds to one of the phases of the associated multi-phase power converter.

The various instances of control circuitry discussed above in reference to FIGS. 2 and 3 may add and shed phases in accordance with different operating conditions, which may be distinguished from one another based on the output current and the various environmental parameters per the discussion above. Accordingly, a particular implementation of one of the control circuits discussed above may take into account the needs of these different operating conditions in order to cause appropriate adding or shedding of phases. For example, an embodiment of one of control circuits 205/305 as discussed above may cause activation of a single phase/voltage regulator for a first operating condition and activation of two or more phases/voltage regulators for a second operating condition. The first operating condition may be one in which efficiency is the primary goal, such as a condition in which the load current demand is low. The second operating condition may be one in which providing sufficient current capacity for rapid transient response is the goal. Since there may be more than two phases, there may be additional conditions for adding and shedding phases. For example, a three phase embodiment may be one in which a first operating condition is provided to optimize efficiency, a second operating condition balances efficiency with current carrying capacity and transient response, while a third operating condition is optimized for transient response.

Further optimization within a given operating condition may be obtained in some embodiments. For example, in embodiments in which switching regulators implement ones of the various phases, the use of PFM and PWM modes may be used to further tune the operation of the power converter for the particular operating condition at a given instance.

Figure 4:
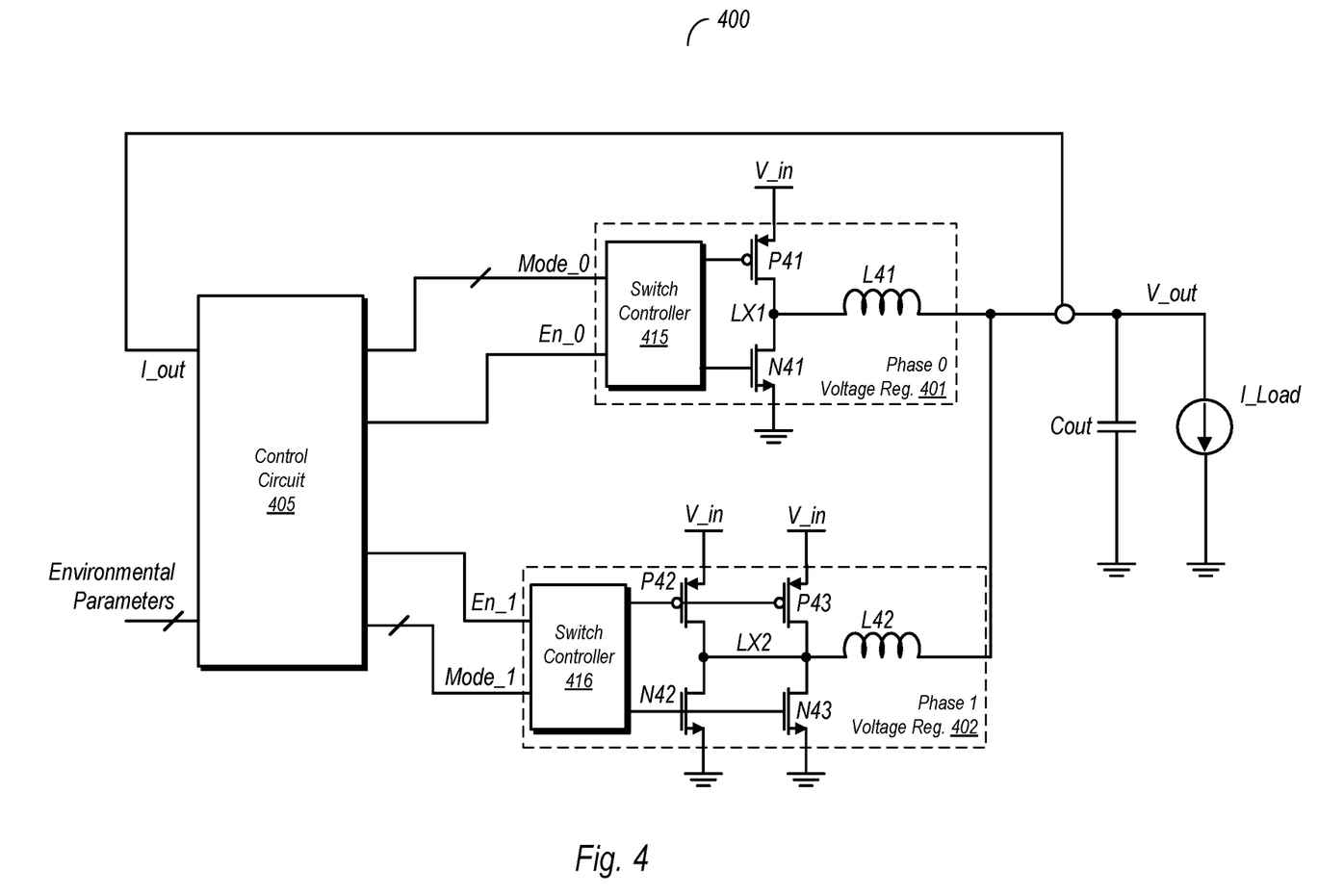
FIG. 4 is a schematic diagram illustrating one embodiment of a multi-phase power converter.

Power Converter Examples:

FIG. 4 is a schematic diagram of one embodiment of a multi-phase power converter. In the embodiment shown, power converter 400 is a multi-phase buck converter. Phase 0 is implemented here by voltage regulator 401, while Phase 1 is implemented by voltage regulator 402. Both of voltage regulators 401 and 402 are coupled to an output voltage node, V_out. A feedback loop to provide the output current, I_out, to control circuit 405 is also provided, although it is noted that separate feedback paths can be provided from switching nodes LX1 and LX2. Power converter 400 is coupled to a load circuit represented here by current source I_Load. Additionally, an output capacitor is coupled between V_out and ground.

Voltage regulator 401 in the embodiment shown implements a low-power phase of power converter 400. The low power phase includes a high side switch implemented with transistor P41 and a low side switch implemented with transistor N41. Transistors P41 and N41 are coupled to one another at switching node LX1. An inductor L41 is coupled between switching node LX1 and the output voltage node, V_out. Switch controller 415 in is coupled to the respective gate terminals of P41 and N41, and may alternately activate and deactivate these devices in accordance with a mode of operation. Switch controller 415 is coupled to receive an enable signal, En_0, and one or more mode signals, Mode_0, from control circuit 405. The enable signal may be used to activate or deactivate voltage regulator 401. The mode signals may be used to set the operating mode of switch controller 415, and thus voltage regulator 401, as well as certain parameters of the selected mode. For example, the mode signals may be used to cause switch controller 415 to operate in one of a PFM or PWM mode, and may also be used to set a frequency of pulses (e.g., in the PFM mode) or the width of pulses (e.g., in the PWM mode).

Voltage regulator 402, as noted above, implements a high power phase in the embodiment shown. This particular phase includes two high side switches, P42 and P43, as well as two low side switches, N42 and N43. The use of multiple high side and low side switches may provide additional current driving capacity for voltage regulator 402 relative to voltage regulator 401. Each of the high side and low side switches in this embodiment are coupled to a switch node LX2. An inductor L42 is coupled between switch node LX2 and the output node, V_out. Switch controller 416 is coupled to receive enable (En_1) and mode control (Mode1) signals from control circuit 405. The enable signal may be used to activate and inactivate voltage regulator 402, while the mode signals may be used to set the operational mode and any additional parameters associated therewith, similar to those used to control the modes of operation for voltage regulator 401.

Control circuit 405 in the embodiment shown may be implemented using one of the control circuits discussed above in reference to FIGS. 1-3 or any of the numerous variations thereof. Signals corresponding to various environmental parameters may be provided to control circuit 405, which may include signals corresponding to the output voltage present on V_out, the input voltage provided on the node V_in, a temperature (e.g., provided based on a temperatures sensed by a nearby sensor circuit), a load power state, and so on.

Figure 5:
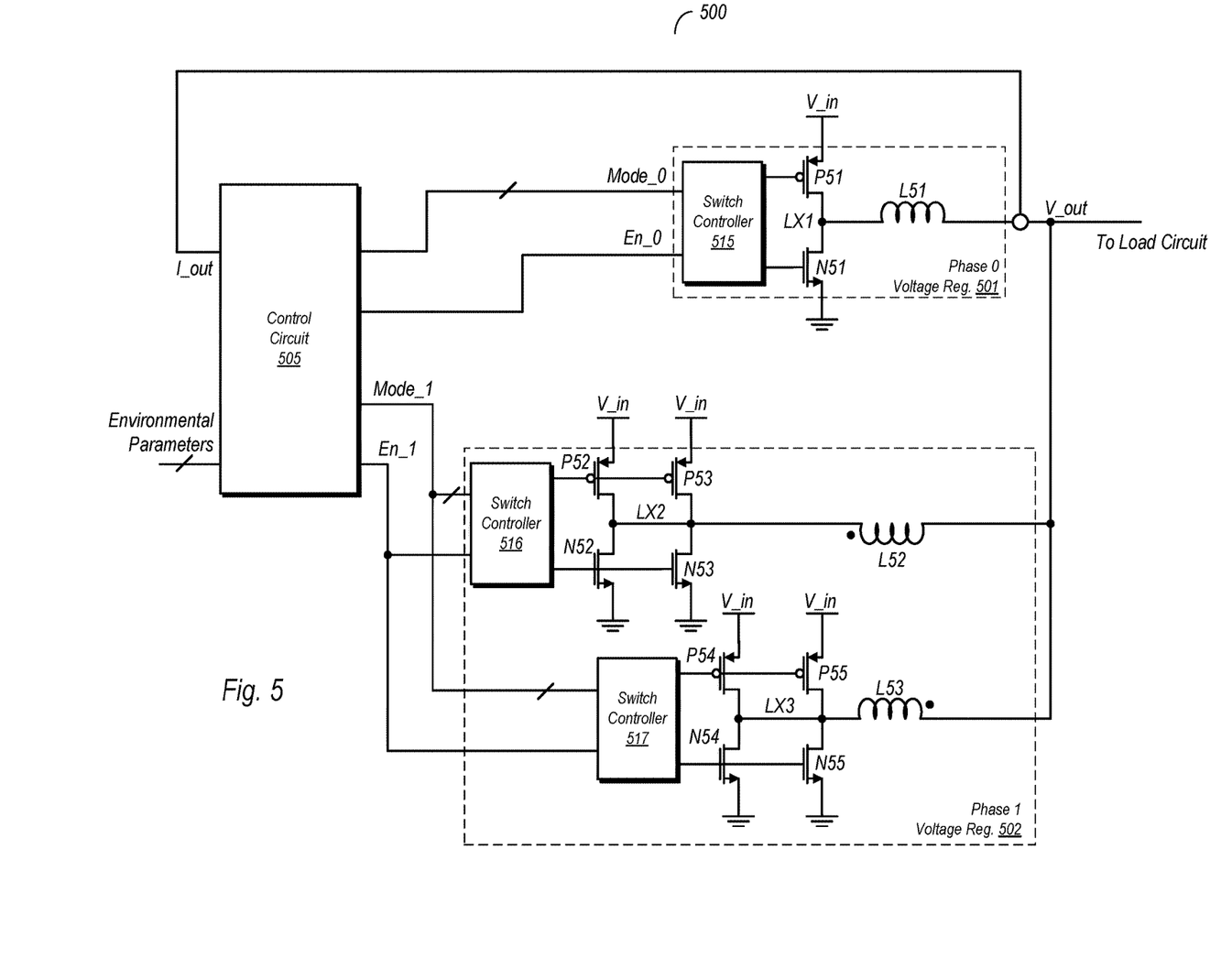
FIG. 5 is a schematic diagram illustrating another embodiment of a multi-phase power converter.

FIG. 5 is a diagram of another embodiment of a power converter. In the embodiment shown, power converter 500 includes a low power phase, voltage regulator 501, and a high power phase, implemented using voltage regulator 502. The low power phase, voltage regulator 501, is arranged in a manner similar to that of voltage regulator 401 of FIG. 4, including a high side switch (P51), a low side switch (N51), a switching node (LX1), an and an inductor (L51) coupled between LX1 and the output voltage node, V_out. Switch controller 515 is coupled to receive mode and enable signals (Mode_0 and En_0) from control circuit 505 and is configured to operate in accordance therewith.

The high power phase, voltage regulator 502, includes two buck converters arranged in a coupled-inductor configuration. Individually, these voltage regulators are arranged similarly to that of the high power phase shown in FIG. 4. Thus, a first voltage regulator includes two high side switches (P52, P53) and two low side switches (N52, N53) coupled to a switching node LX2, and an inductor L52 coupled between the switching node and the output voltage node, V_out. Switch controller 516 is configured to control operation of the correspondingly coupled switches per mode control (Mode1) and enable (En_1) signals received from control circuit 505.

The second buck converter for the high powered phase includes two high side switches (P54, P55), two low side switches (N54, N55), a switching node (LX3) coupled to the high and low side switches, and an inductor L53 coupled between the switching node and the output voltage node, V_out. Switch controller 517 is configured to control the operation of the correspondingly coupled high and low side switches based on the Mode_1 and En_1 signals received from control circuit 505.

The use of the coupled inductor configuration in the high side phase of power converter 500 may provide for greater efficiency when operating in a high power mode relative to the embodiment of FIG. 4 that does not include coupled inductors. Additionally, a lower switching frequency may be possible for the coupled inductor configuration. Furthermore, the redundant high and low side switches in the voltage regulators of the high power phase may result in greater current carrying capacity, thereby improving transient response.

Control circuit 505 in the embodiment shown may correspond to any of the control circuits discussed herein and any variation thereof. Generally speaking, control circuit 505, like control circuit 405 of FIG. 4, may receive feedback corresponding to an output current of power converter 500, as well as signals corresponding to one or more environmental parameters. The signals corresponding to the environmental parameters may be used to generate a threshold value. This threshold value may vary as the values of the environmental parameters vary. The output current may be compared with the variable threshold to enable control circuit 505 to determine when a phase is to be added or shed (enabled or disabled).

Figure 6:
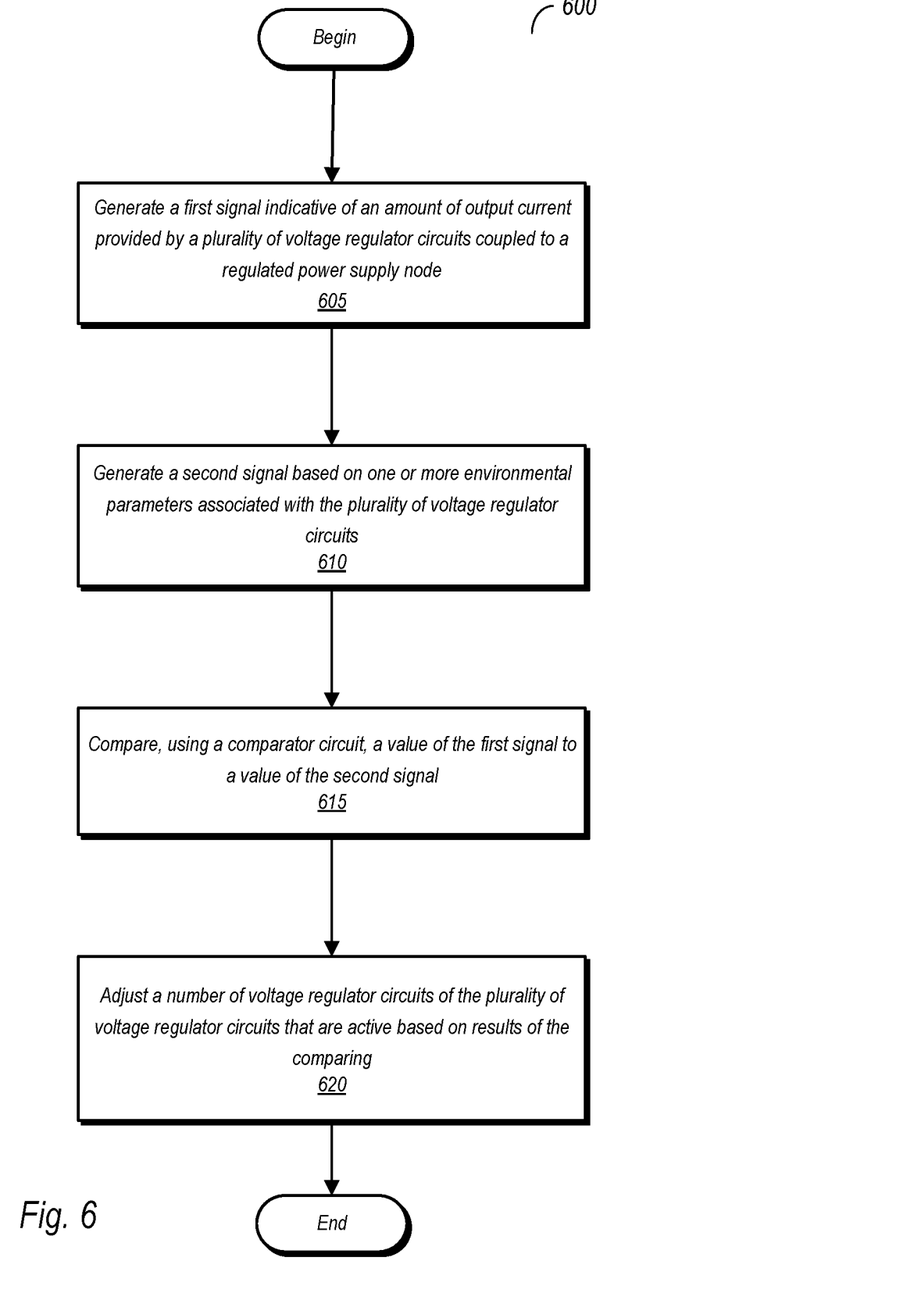
FIG. 6 is a flow diagram illustrating one embodiment of a method for operating a power converter.

Method for Operating a Power Converter:

FIG. 6 is a method for operating one embodiment of a power converter. Method 600 as discussed herein may be performed using any type of power converter discussed herein, explicitly or implicitly. Power converters not discussed herein but otherwise capable of carrying out Method 600 are considered to fall within the scope of this disclosure.

Method 600 includes generating a first signal indicative of an amount of output current provided by a plurality of voltage regulator circuits coupled to a regulated power supply node (block 605). The method further includes generating a second signal based on one or more environmental parameters associated with the plurality of voltage regulator circuits (block 610). After the first and second signals are generated, the method further includes comparing, using a comparator circuit, a value of the first signal to a value of the second signal (block 615), and adjusting a number of voltage regulator circuits of the plurality of voltage regulator circuits that are active based on results of the comparing (block 620).

In some embodiments, the method includes adjusting, based on current values of the one or more environmental parameters, a value of the second signal using a threshold adjustment circuit. In various embodiments, at least one of the environmental parameters is an input voltage value. Embodiments are further contemplated in which at least one of the environmental parameters is an output voltage value. Embodiments are also further contemplated in which at least one of the environmental parameters is a temperature associated with the plurality of voltage regulator circuits.

Based on the comparisons performed, the method may include activating a single one of the plurality of voltage regulator circuits for a first operating condition. The method may also include, based on the comparisons performed, activating two or more of the plurality of voltage regulator circuits for a second operating condition.

Example System

Figure 7:
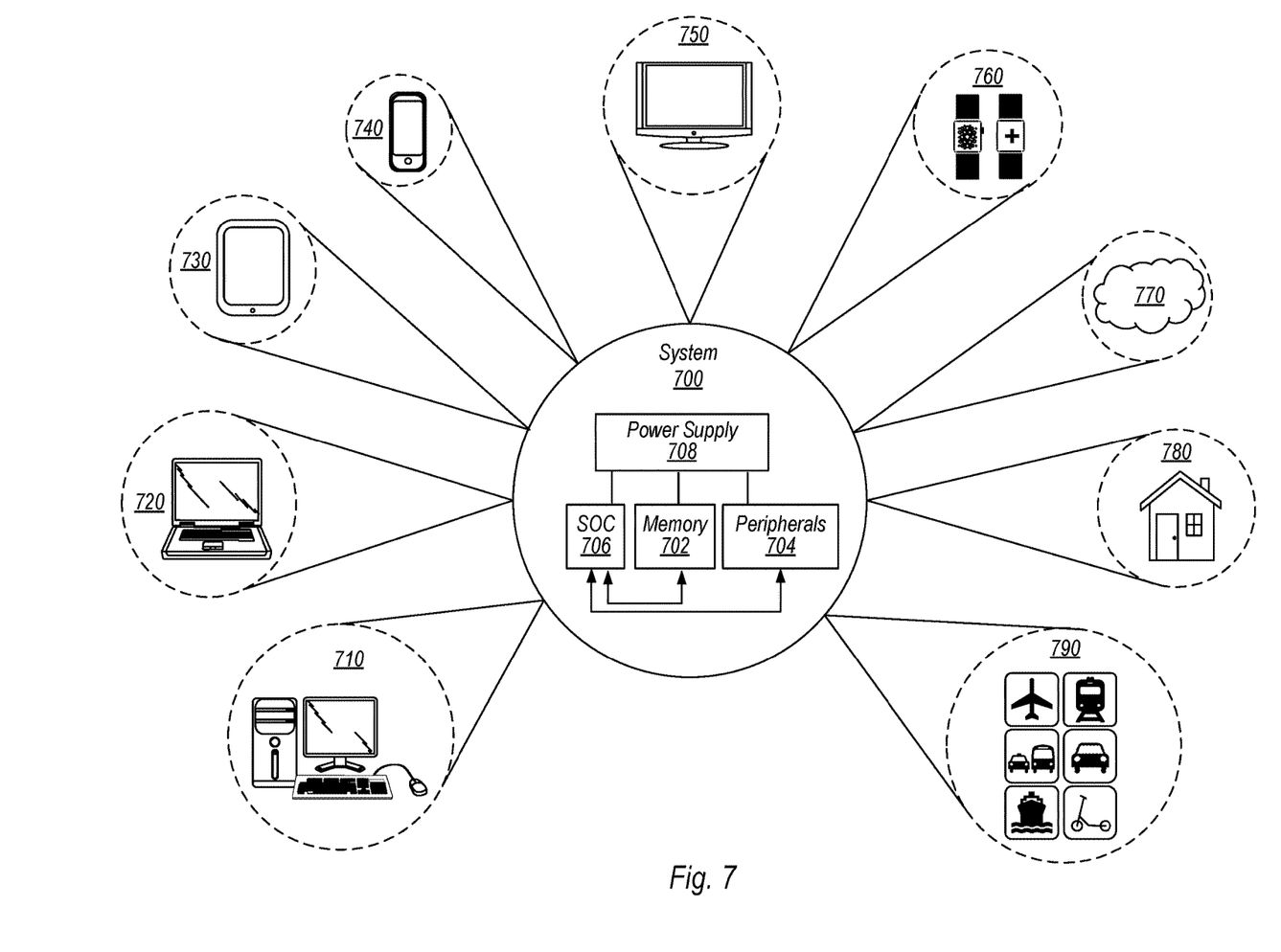
FIG. 7 is a block diagram of an example system.

Turning next to FIG. 7, a block diagram of one embodiment of a system 700 is shown that may incorporate and/or otherwise utilize the methods and mechanisms described herein. In the illustrated embodiment, the system 700 includes at least one instance of a system on chip (SoC) 706 which may include multiple types of processing units, such as a central processing unit (CPU), a graphics processing unit (GPU), or otherwise, a communication fabric, and interfaces to memories and input/output devices. In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

Various circuits in the system 700 may receive power from a power converter such as those discussed above and/or falling within the scope of this disclosure. These converters may be multi-phase converters that include current control loops with an adjustable threshold used to determine when to add or shed phases.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a power converter having a plurality of voltage regulator circuits coupled to a regulated power supply node, wherein ones of the plurality of voltage regulator circuits are configured to generate, when active, a particular output voltage on the regulated power supply node; and
a control circuit configured to adjust a number of voltage regulator circuits of the plurality of voltage regulator circuits that are active based on an output current of the power converter and one or more environmental parameters associated with the plurality of voltage regulator circuits; wherein the control circuit includes:
a transconductance amplifier configured to generate an initial threshold value based on an input voltage and the number of voltage regulator circuits that are currently active;
a digital-to-analog converter (DAC) configured to generate an adjustment signal based on the number of voltage regulator circuits that are currently active; and
a summing circuit configured to generate an adjustable threshold value based on the initial threshold value and the adjustment signal.

2. The apparatus of claim 1, wherein the control circuit includes:
a comparator circuit configured to compare the output current to the adjustable threshold value.

3. The apparatus of claim 1, wherein the one or more environmental parameters include an input voltage provided to the plurality of voltage regulator circuits.

4. The apparatus of claim 1, wherein the one or more environmental parameters includes the particular output voltage provided by the power converter.

5. The apparatus of claim 1, wherein the one or more environmental parameters include a temperature of the plurality of voltage regulator circuits.

6. The apparatus of claim 1, wherein the one or more environmental parameters include an amount of power consumed by a load circuit coupled to receive the particular output voltage.

7. The apparatus of claim 1, wherein the plurality of voltage regulator circuits comprises a plurality of switching voltage regulators.

8. The apparatus of claim 1, wherein the plurality of voltage regulator circuits comprises a plurality of buck converters configured to provide the particular output voltage at a value less than a value of an input voltage.

9. The apparatus of claim 8, wherein the plurality of voltage regulator circuits includes at least one pair of buck converters arranged in a coupled inductor configuration.

10. The apparatus of claim 1, wherein the control circuit is configured to activate a single one of the plurality of voltage regulator circuits for a first operating condition, and further configured to activate two or more of the plurality of voltage regulator circuits for a second operating condition.

11. A method comprising:
generating a first signal indicative of an amount of output current provided by a plurality of voltage regulator circuits coupled to a regulated power supply node;
generating a second signal based on one or more environmental parameters associated with the plurality of voltage regulator circuits, wherein generating the second signal comprises:
generating, using a transconductance amplifier, an initial signal based on an input voltage and a number of the plurality of voltage regulator circuits that are currently active;
generating, using a digital-to-analog converter (DAC), an adjustment signal based on the number of plurality of voltage regulator circuits that are currently active; and
combining, using a summing circuit, the initial signal and the adjustment signal to generate the second signal;
comparing, using a comparator circuit, a value of the first signal to a value of the second signal; and
adjusting a number of voltage regulator circuits of the plurality of voltage regulator circuits that are active based on results of the comparing.

12. The method of claim 11, further comprising generating the adjustment signal based on current values of the number of plurality of voltage regulator circuits that are currently active and at least one additional environmental parameter, a value of the second signal using a threshold adjustment circuit.

13. The method of claim 11, wherein at least one of the environmental parameters is an input voltage value.

14. The method of claim 11, wherein at least one of the environmental parameters is an output voltage value.

15. The method of claim 11, wherein at least one of the environmental parameters is a temperature associated with the plurality of voltage regulator circuits.

16. The method of claim 11, further comprising:
activating a single one of the plurality of voltage regulator circuits for a first operating condition;
activating two or more of the plurality of voltage regulator circuits for a second operating condition.

17. A system comprising:
a load circuit configured to operate using a regulated supply voltage;
a power converter configured to generate the regulated supply voltage, wherein the power converter includes a plurality of switching voltage regulators, wherein ones of the plurality of switching voltage regulators are configured to, when active, generate the regulated supply voltage; and
a control circuit coupled to the plurality of switching voltage regulators, wherein the control circuit is configured to set a number of the plurality of switching voltage regulators that are active at a given time based on an output current of the power converter and a plurality of environmental parameters associated with the plurality of switching voltage regulators, wherein the control circuit includes:
a decoder having a plurality of inputs corresponding to ones of the plurality of environmental parameters and generate configured to generate a first digital value indicative of an adjustable threshold; and
an analog-to-digital converter (ADC) configured to generate a second digital value based on the output current.

18. The system of claim 17, wherein the control circuit includes:
a comparator configured to determine which of the plurality of switching voltage regulators are to be active based on comparing the first digital value to the second digital value.

19. The system of claim 17, wherein the switching voltage regulators are buck converters, and wherein the power converter includes at least one pair of buck converters arranged in a coupled inductor configuration.

20. The system of claim 17, wherein the plurality of environmental parameters include two or more of the following:
a current value of the regulated supply voltage;
a temperature value associated with the power converter;
an input voltage received by the power converter.

* * * * *